US006460563B2

(12) United States Patent
Olson et al.

(10) Patent No.: US 6,460,563 B2
(45) Date of Patent: *Oct. 8, 2002

(54) IRRIGATION SYSTEM APPARATUS, AND RELATED METHOD

(75) Inventors: Donald O. Olson, El Cajon; Gerald Peterson, Riverside; Aaron De Laby, Carlsbad, all of CA (US)

(73) Assignee: Olson Irrigation Systems, Santee, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/705,321

(22) Filed: Aug. 29, 1996

(65) Prior Publication Data

US 2001/0045230 A1 Nov. 29, 2001

(51) Int. Cl.[7] .................................................. F16L 5/00
(52) U.S. Cl. ....................... 137/364; 137/624.2; 137/883
(58) Field of Search ................................. 137/883, 363, 137/364, 624.2, 561 R; 285/906, 373, 419, 205, 192, 133.11, 5; 251/315.01, 315.1, 148; 239/69, 70

(56) References Cited

U.S. PATENT DOCUMENTS

| | | | | |
|---|---|---|---|---|
| 697,051 A | * | 4/1902 | Whiton ........................ 285/205 |
| 1,875,209 A | * | 8/1932 | Baldwin, Jr. ............. 285/205 X |
| 2,034,559 A | * | 3/1936 | Brunner ................... 285/205 X |
| 2,284,222 A | * | 5/1942 | Miller ...................... 285/205 X |
| 2,598,961 A | * | 6/1952 | Andrus ........................ 137/883 |
| 3,599,669 A | * | 8/1971 | Polzer ......................... 137/870 |
| 3,762,684 A | * | 10/1973 | Stein ........................... 251/148 |
| 3,765,707 A | * | 10/1973 | Westberg ................ 285/419 X |
| 4,103,943 A | * | 8/1978 | Curtin ......................... 285/419 |
| 4,787,655 A | * | 11/1988 | Gross et al. ................. 285/151 |
| 4,834,143 A | * | 5/1989 | Bayat ..................... 137/883 X |
| 4,872,575 A | * | 10/1989 | Kobilan ...................... 220/3.3 |
| 4,887,644 A | * | 12/1989 | Jeromson et al. ....... 251/148 X |

(List continued on next page.)

OTHER PUBLICATIONS

An Advertisement on p. 34 of the Jan.–Feb., 1994 issue of Golf Course Irrigation for a crimped electrical connector.
A two page marketing brochure without a publication date for a valve manifold splice kit sold by Paige.
An eight page marketing brochure for Electrical Products for Irrigation from 3M bearing a 1993 copyright notice to 3M.

Primary Examiner—Lesley D. Morris
Assistant Examiner—John Bastianelli
(74) Attorney, Agent, or Firm—J. Mark Holland

(57) ABSTRACT

An improved apparatus and method are provided for irrigation systems such as automated sprinkler systems. A preassembled housing or valve box includes an inlet for receiving water and one or more outlets for distribution of water to other components in the irrigation system, and also includes manifolding and power and valve means for selectively controlling the flow of water from the outlets. Many of the manifold components are integrally molded with each other and provided in modular form so that the system can be relatively compact and can be customized into a variety of configurations. The manifold can consist of or include integrally formed or interconnected valve bases. The electrical power system includes a main terminal box with power lines leading to connectors adjacent each outlet, so that solenoid valves may be readily connected thereto and replaced as necessary. O-rings, non-conducting gel, and similar mechanisms are provided to ensure the watertightness of the electrical connections. The box and its components may be manufactured, assembled, and installed more reliably, conveniently and economically than conventional irrigation systems, and may also be tested before installation.

15 Claims, 6 Drawing Sheets

U.S. PATENT DOCUMENTS

| | | | | |
|---|---|---|---|---|
| 4,960,296 A | * | 10/1990 | Thelen et al. | 285/906 X |
| 5,007,666 A | * | 4/1991 | Kyfes | 285/419 X |
| 5,131,597 A | * | 7/1992 | Bard et al. | 239/145 |
| 5,133,498 A | * | 7/1992 | Sealy et al. | 239/70 X |
| 5,140,751 A | * | 8/1992 | Faust | 30/91.1 |
| 5,245,507 A | * | 9/1993 | Ericksen | 361/641 |
| 5,252,779 A | | 10/1993 | DiRienzo | 174/87 |
| 5,294,212 A | * | 3/1994 | Mehoudar | 405/36 |
| 5,327,925 A | * | 7/1994 | Ortel | 137/15 |
| 5,368,229 A | * | 11/1994 | Hayes et al. | 239/69 |
| 5,466,052 A | * | 11/1995 | Tietje | 303/1 |
| 5,560,542 A | * | 10/1996 | Reid | 239/70 |
| 5,579,804 A | * | 12/1996 | Roberts | 137/385 |
| 5,588,462 A | * | 12/1996 | McHugh | 137/557 |
| 5,608,189 A | * | 3/1997 | Winterhoff et al. | 285/906 X |
| 5,669,405 A | * | 9/1997 | Englemann | 137/115.07 |
| 5,694,922 A | * | 12/1997 | Palmer | 128/202.27 |
| 5,746,250 A | * | 5/1998 | Wick | 239/69 X |
| 5,908,157 A | * | 6/1999 | Antonellis et al. | 239/70 |

* cited by examiner

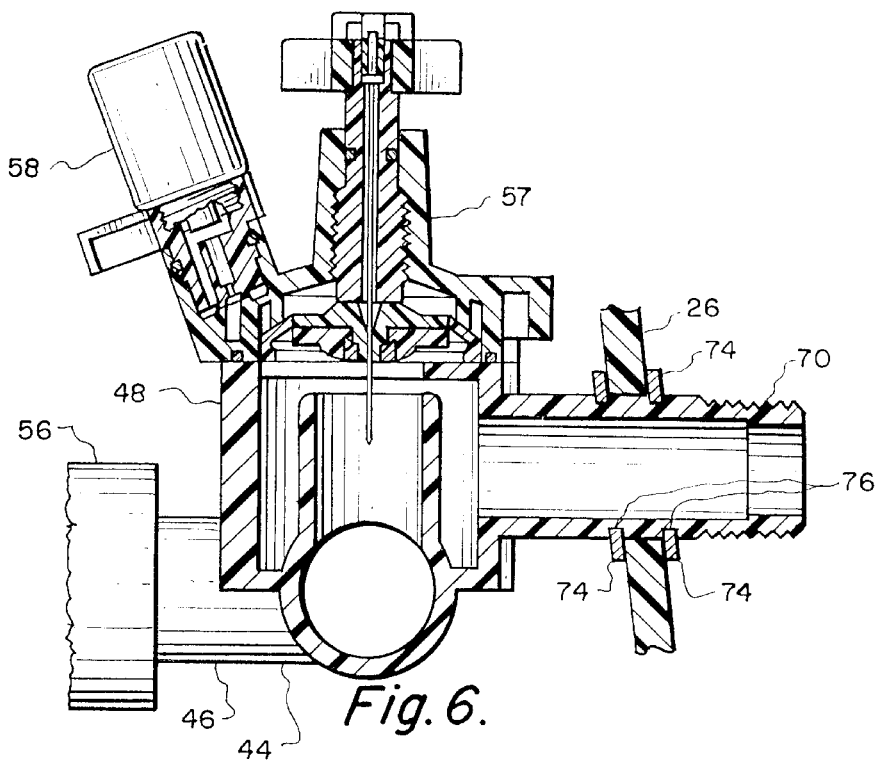
Fig. 6.
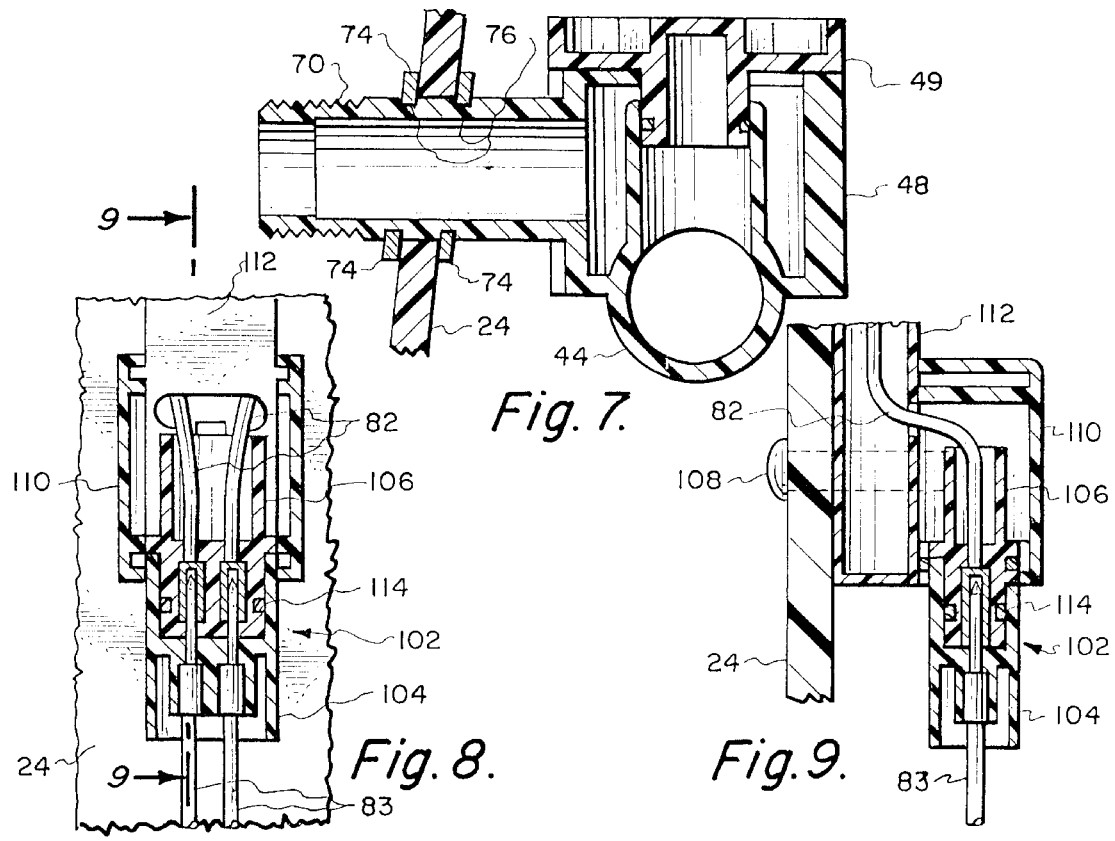
Fig. 7.
Fig. 8.
Fig. 9.

IRRIGATION SYSTEM APPARATUS, AND RELATED METHOD

This invention relates to an improved apparatus and method for irrigation and, more particularly, to a valve box and manifold assembly, and method of installation and use of same.

BACKGROUND OF THE INVENTION

It is well known to utilize pipes, valves, controllers and related mechanisms to distribute water for purposes of irrigating lawns, gardens and the like. Typically, irrigation systems utilize a manifold to distribute the water in a controlled manner into a plurality of lines, each of which eventually irrigates a certain area, plant, etc.

In prior art systems, the manifold and related controlling components are assembled on-site, in a custom, piecework manner. Because the systems (or at least most portions thereof) are commonly buried underground, the relatively precise connections for the electrical control mechanisms and the fluid manifold and valves can be somewhat awkward to accomplish. Typically, trenches and open holes are prepared in the dirt at the installation location, and the piecemeal assembly of the system occurs either down in those holes and trenches or adjacent thereto, or in a combination of those two methods.

Much of the wiring and assembly requires inserting and tightening screws, nuts, bolts, and fittings, many of which must hold wires and/or fluid seals in specific positions and relationships. While this can be accomplished in the conventional manner just described, it typically involves a substantial amount of effort, strain, body contortion, and focus by the assembling person or persons in order to ensure watertight seals and satisfactory wiring and adjustment of the electrical controls and components. Among other things, some care must be taken to minimize the dirt which may tend to undesirably get inside or between the various parts and degrade and/or prevent their desired performance.

In addition, it is commonly desirable that not only the plumbing connections, but also the electrical connections, be watertight. Among other things, leaks, overwatering, rain runoff or similar events can "flood" buried electrical pathways and cause electrical shorts if those pathways are not watertight. This adds to the number of watertight connections that must typically be assembled, and correspondingly makes it more complex and difficult to install an irrigation system successfully and properly.

Furthermore, the density (the number of) the valves that may be assembled in a given valve box is limited by the space required for the various connections between the plumbing components. Accordingly, multiple valve boxes may be required to accomplish a desired distribution of water, which cost (in time, materials, and effort) might be reduced if more valves could be located within a single box.

OBJECTS AND ADVANTAGES OF THE INVENTION

It is, therefore, an object of the invention to provide an apparatus and method for irrigation systems, which enables more certain, secure, and easy assembly and installation of a valve box and manifold and control mechanisms to accomplish desired water distribution.

Another object of the invention is the provision of an improved irrigation apparatus including a valve box or housing means for housing various components, including manifold means for transporting water, valve means for directing the flow of water through the manifold, and control means for controlling the valve means. In the preferred embodiment, the housing means is configured so it can be buried with its upper surface flush with ground level. In a preferred method of use, the apparatus is integrally assembled prior to installation of the housing means into the ground.

A further object of the invention is the provision of an apparatus of the aforementioned character, in which the valve means and manifold means includes an integrally-formed valve and tee. In the preferred embodiment, the integrally-formed valve is a ball valve.

Another object of the invention is the provision of an apparatus of the aforementioned character, in which at least some portions of the manifold means are assembled by use of a snap-on clamp. The preferred clamp is assembled about adjacent manifold components, and consists of interchangeable, interengageable portions, each preferably having a spring-like detent on a first portion and a mating receiving means on a second portion. The preferred embodiment includes two such portions (therefore halves), with the spring-like detent of each preferably engaging in the mating receiving means of the other, so that two halves are assembled together to retain the adjacent manifold components in operative relationship with each other. Among the many alternative embodiments of the invention would be clamps formed from more than two portions, clamps hinged or hooked together on one side and snapped together in place on the other, and others that would make themselves apparent to persons of ordinary skill in the art.

An additional object of the invention is the provision of an apparatus of the aforementioned character, in which the control means includes electrical power lines which are assembled and retained in the valve box or housing means prior to shipment of the assembly to the installation site. This permits the power lines to be assembled in a location that permits testing for watertightness, ease of installation, and improved ease of future service, maintenance, and connectivity to other components of the apparatus. The preferred embodiment includes a main electrical junction box affixed to the valve box for connecting the lines to an external electrical power source (although persons of ordinary skill in the art will understand that alternative embodiments would include providing a battery-powered controller inside or affixed to the housing means). The preferred power lines also include one or more connector means for connecting the lines to other components of the control means, and retaining means for retaining the power lines preferably includes one or more water-tight connector means. As described below, these connector means permit the ready and selective assembly, installation, servicing, and replacement of solenoid valves in the valve box.

Yet another object of the invention is the provision of an apparatus of the aforementioned character, in which the manifold means includes a plurality of outlet pipes through which water may be directed, and the valve means includes one or more valve members assembled with corresponding of those outlets, and the control means further includes solenoid actuator means associated with each valve member. In the preferred embodiment, the outlet pipes are mounted and retained in sidewall portions of the housing means.

A still further object of the invention is the provision of an apparatus of the aforementioned character, in which the manifold means includes one or more integrally-formed manifold members. These members preferably have a single inlet port and a plurality of outlet ports, with the outlet ports adapted for connection with downstream distribution lines for distribution of the water. In the preferred embodiment, solenoid valve means are adjacent one or more of the outlet ports for controlling flow of water therethrough, the solenoid valve means thus also constituting at least a part of the control means. Among other things, the integral molding of the manifold members provides a higher density of branching of the manifold than can be accomplished with traditional plumbing components; more distribution lines can therefore branch from a single conventional valve box or housing than with prior art systems.

Another object of the invention is the provision of an apparatus of the aforementioned character, in which the manifold means includes attachment sections adjoining each outlet port. These attachment sections are preferably configured to selectively receive either a plug member (to prevent flow through the port) or one of the aforementioned solenoid valve means (to permit selective, controlled flow therethrough). In the preferred embodiment, the manifold means is attached to the housing means by providing openings through the walls of the housing means, positioning one or more outlet ports of the manifold means through corresponding openings in the housing means, and using attachment means for holding the manifold outlet port or ports in relationship to the corresponding opening. The preferred manifold means also includes attachment means at one or more ends thereof for selectively attaching either cap means for terminating the manifold means or attaching further manifold components. Among other things, the cap means provide a convenient way to drain water from the irrigation system, to help prevent damage during winter freezes, for example.

An additional object of the invention is the provision of a substantially compact, pre-assembled apparatus for installation in a sprinkler system. The preferred apparatus includes a housing for containing other components of the assembly, an inlet for receiving water, a plurality of outlet pipes mounted in the housing and capable of receiving water from the inlet, and a corresponding plurality of fittings affixed to the outlet pipes. The preferred fittings are configured to selectively receive either a plug member to prevent flow through the corresponding outlet pipe or to receive a solenoid valve means for selectively permitting flow through the corresponding outlet pipe. At least one of the fittings is preferably integrally formed with at least another of the fittings, so that the integrally-formed fittings constitute manifold means for distributing water to selected of the outlet pipes.

Still another object of the invention is the provision of an apparatus of the aforementioned character, in which an inlet port is also integrally formed with the integrally-formed fittings, for receiving water into the manifold means.

Yet another object of the invention is the provision of an apparatus of the aforementioned character, further including electrical control means for controlling the operation of the solenoid valve means. Preferably, the housing means has one or more water-tight connectors affixed to it. These connectors form part of the electrical control means, and protect from undesirable moisture one or more electrical connections between the solenoid valve means and power lines to operate the solenoid valve means.

An additional object of the invention is the provision of an improved method for installing an automated sprinkler system. The preferred method includes providing a pre-assembled apparatus having a valve box, an inlet affixed to the box for receiving water, one or more outlets affixed to the box for receiving water from the inlet and distributing that water to other components of the sprinkler system, one or more solenoid valves positioned between the inlet and the one or more outlets for selectively controlling the flow of water from the outlets, and electric power lines affixed to the box for operating the one or more solenoid valves. Other steps in the preferred method include positioning the pre-assembled apparatus at a desired final location at an installation site, connecting a water source to the inlet, connecting other components to the outlets, and connecting an electric power source to the power lines.

Still another object of the invention is the provision of a method of the aforementioned character, in which the inlet is integrally formed with a master valve and a tee. Further steps of the preferred method include having the one or more outlets integrally formed with each other to provide a compact manifold for distributing the water, and the manifold including mounting ports adjacent the outlets for selectively receiving either the one or more solenoid valves or receiving plug members for blocking water flow therefrom.

A further object of the invention is the provision of a method of the aforementioned character, in which a main electrical junction box is provided on the valve box for connecting the apparatus to an external electrical power source (preferably including a remotely located controller), and in which the power lines distribute power from the main electrical junction box to connector means affixed to the valve box adjacent the mounting ports. Those preferred connector means are configured for receiving corresponding connector means on the solenoid valves to accomplish the distribution of electric power to the solenoid valves. In the preferred method, moisture sealing means are provided at the main electrical junction box and adjacent the connector means, for preventing moisture from damaging the electrical connections along the power lines. In addition, the preferred method provides corresponding labels on each valve and its corresponding power lines at the main electrical junction box. This correspondence permits ready correlation, repair and modification of the pre-assembled valve box apparatus.

An additional object of the invention is the provision of a method of the aforementioned character, further including the step of testing the apparatus prior to shipment of same to an installation site. In the preferred method, both the electrical operation and watertightness of the plumbing components can be readily tested on each unit as it is assembled, prior to final packaging and shipment.

Other objects and advantages of the invention will be apparent from the following specification and the drawings.

BRIEF DESCRIPTION OF THE DRAWINGS

FIG. 6 is a sectional view, taken on the broken line 6—6 of FIG. 2;

FIG. 7 is a sectional view, taken on the broken line 7—7 of FIG. 2;

FIG. 8 is a sectional view taken on the broken line 8—8 of FIG. 2;

FIG. 9 is a sectional view, taken on the broken line 9—9 of FIG. 8;

DESCRIPTION OF THE PREFERRED EMBODIMENT

Figure 1:
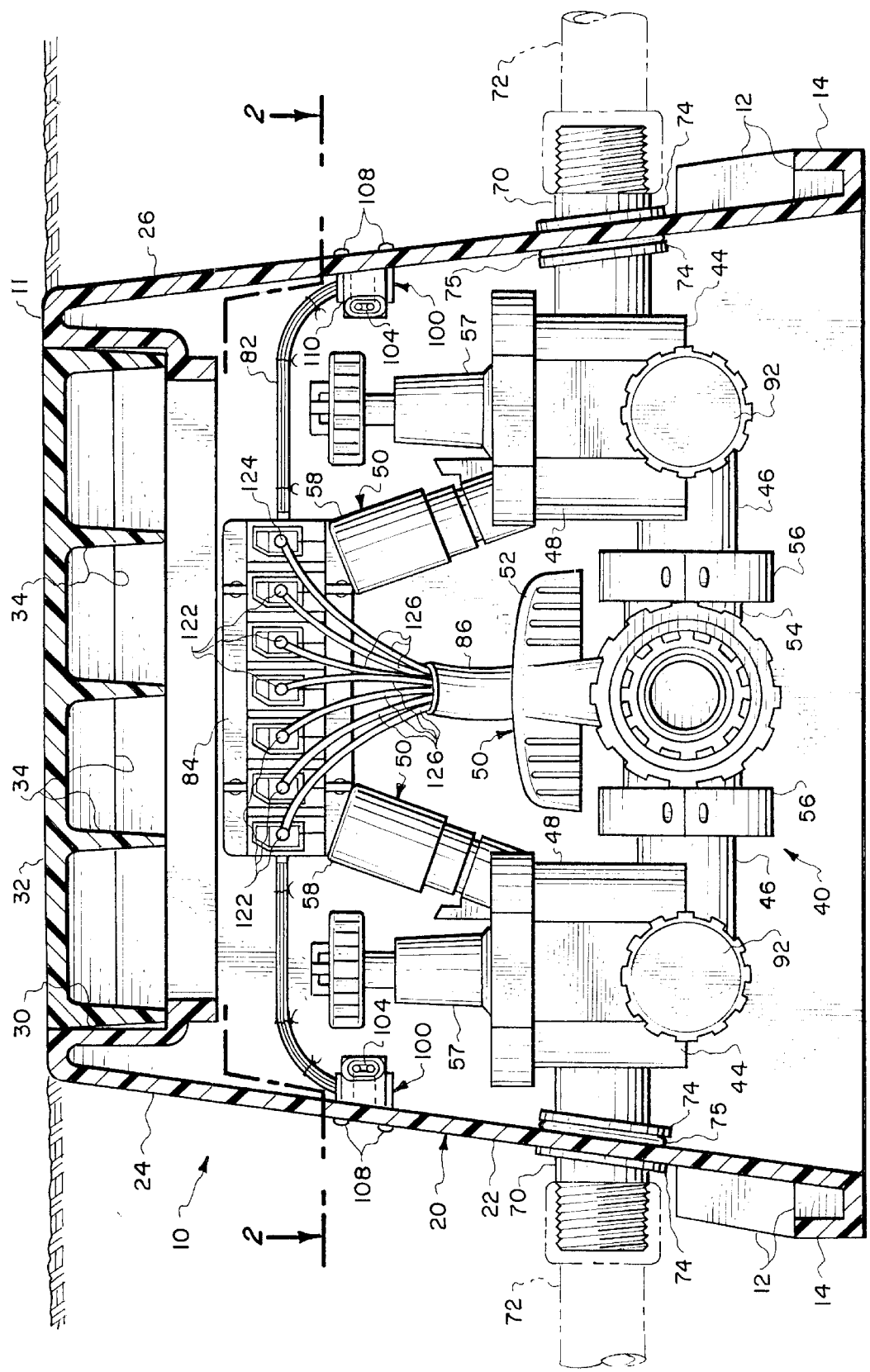
FIG. 1 is a sectional elevational view, showing a preferred embodiment of the apparatus of the invention.

The drawings illustrate a preferred embodiment of the invention, including an improved irrigation apparatus 10. Preferably, the components of apparatus 10 are fabricated from suitably strong, lightweight materials to provide reliable service in an irrigation system and ease of portability and installation. Many of the components may be fabricated by injection molding, blow molding, or similar processes. Preferably, most of the mechanical components of the invention are injection molded from glass-filled reinforced nylon, but persons of ordinary skill in the art will understand that the invention may be effectively practiced with a wide variety of materials and fabrication methods.

Typical installations involve burying the apparatus 10 so that its normally uppermost surface 11 is flush with ground level (see FIG. 1) on or adjacent the site to be irrigated. Irrigation itself involves the distribution of water, and the apparatus is therefore likely to be exposed to potentially high levels of moisture, dirt, and the like. Leaks, overwatering, rain and the like can even flood the apparatus with water. Accordingly, the materials and assembly are preferably resistant to rust and similar damage that can occur under such conditions.

The preferred apparatus 10 includes housing means 20 such as a valve box 22, for housing various other components of the apparatus 10. The housing means 20 can be of a generally conventional configuration, and can even be fabricated from prior art valve boxes (by drilling or otherwise providing openings therein for assembly of various components, as described herein). Conventional valve boxes are typically provided with standard openings 15, FIG. 2. Persons of ordinary skill in the art will understand that those openings 15 may be utilized, by way of example, for passage of some or all of the various plumbing and electrical components from inside to outside the box 22 (such as cable 86, as described herein).

The housing means 20 preferably includes sides 24 and 26 and ends 28 and 29, although persons of ordinary skill in the art will also understand that the housing means 20 can be provided in any of a wide variety of configurations and sizes. To provide ready access to the components within the valve box 22, an opening 30 is preferably provided at an upper edge thereof. The opening 30 is preferably configured to receive and support a mating cover member 32. The opening 30 and cover member 32 are preferably sized and shaped to permit ready access to the components inside the valve box 22, while keeping the size of the cover minimal so that it does not have to support loads that are too large (which would require bulkier covers and valve boxes) and so that it is not so noticeable among the landscaping in which the apparatus is placed. In a preferred embodiment, FIG. 1, this is accomplished by configuring the walls 24, 26, 28 and 29 so that they slope inwardly toward the upper surface 11 of the apparatus 10. This sloping is not critical to the function of the invention, but is just one of the many ways of practicing the invention while balancing the foregoing factors of desired ready access to the components inside the valve box 22 and reduced exposed upper surface area 11. The sloping also helps reduce the likelihood that the box 22 does not "float" out of the ground during heavy rains or the like, which might occur if the surrounding dirt softens or liquefies and the box 22 becomes flooded.

The ready access to the components inside the apparatus is beneficial not only to facilitate installation of the apparatus, but also for replacement, modification, and/or service of the unit.

Persons of ordinary skill in the art will also understand that areas of the valve box 22 may be desirably strengthened by the provision of flanges or support ribs 12. Similarly, flanges or support ribs 34 may be provided on the cover 32, to help the lid bear relatively heavier loads without requiring excessive thicknesses and weight within the cover 32 itself.

As indicated herein, the preferred installation of the apparatus is buried with its upper surface 11 flush with surrounding ground level. In a typical installation, a suitably large hole is dug in the ground adjoining one or more trenches for inlet and outlet plumbing and for electrical power and control cables to connect the box 22 to both an external power source and a preferably remotely located control mechanism. Controllers of this type are commonly mounted, for example, on interior garage walls. Pea rock or similar material is spread in the bottom of the hole, and the apparatus is placed in the hole. After power, inlet water supply, and downstream components are affixed to the apparatus 10 (as described herein), dirt is backfilled onto a lowermost lip 14 and up to the upper surface 11 of the apparatus 10, as illustrated in FIG. 1. The configuration of the lip 14, the supporting ribs 12, and the dirt placed thereon helps anchor the apparatus 10 in its desired location and prevent undesirable collapse of the container (from settling of the ground, pressure on the walls, and the like).

The apparatus 10 and its various components are preferably configured and sized to permit the apparatus 10 to be integrally assembled prior to installation of the housing means 20 into the ground. Part of this preferred integral pre-installation assembly includes assembling manifold means 40 with the housing means 20. Persons of ordinary skill in the art will understand that the manifold can consist of, and/or include, integrally formed or interconnected valves or valve bases, as shown in the drawings and described more thoroughly below.

Figure 2:
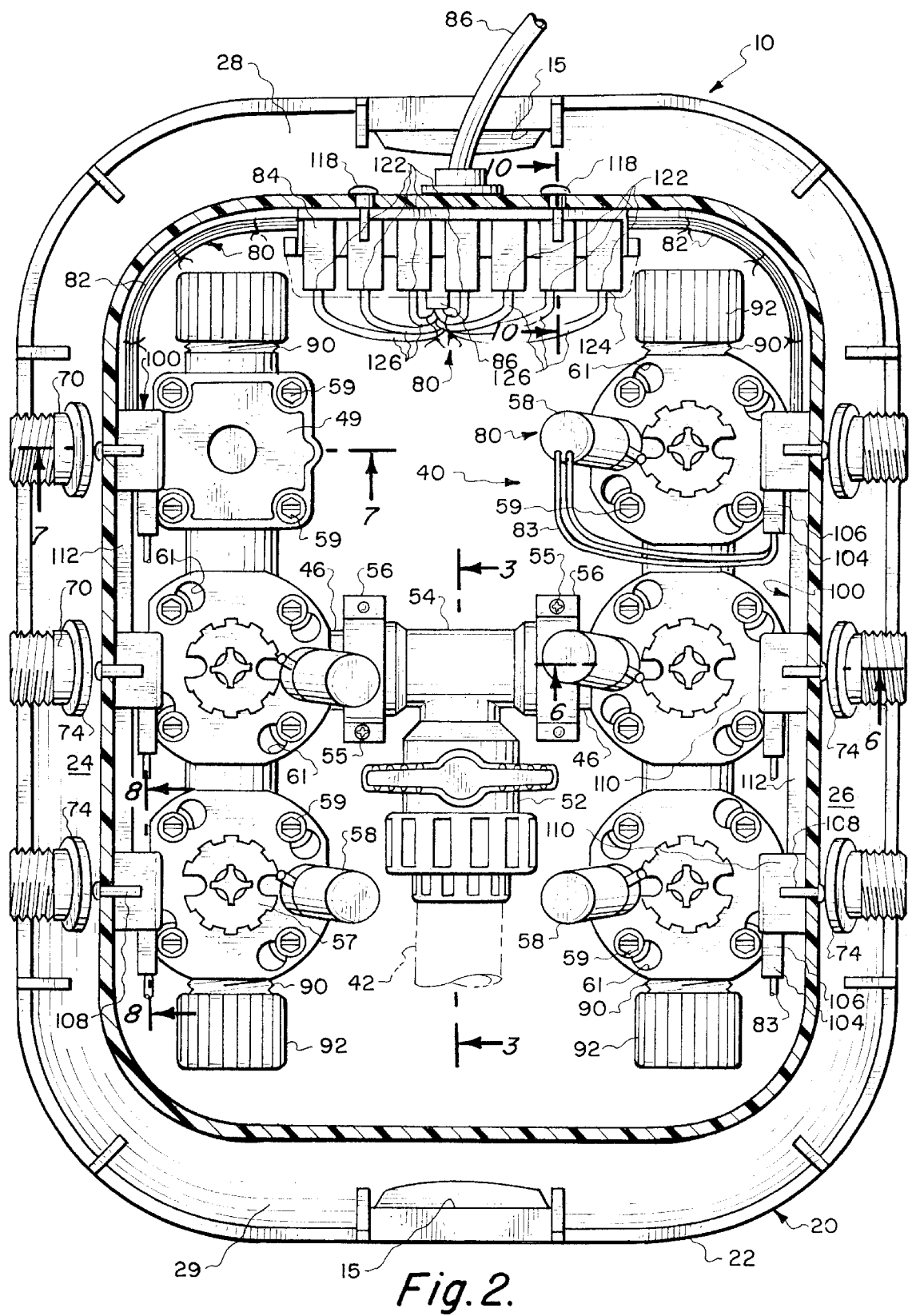
FIG. 2 is a sectional bottom view, taken on the broken line 2—2 of FIG. 1.
Figure 3:
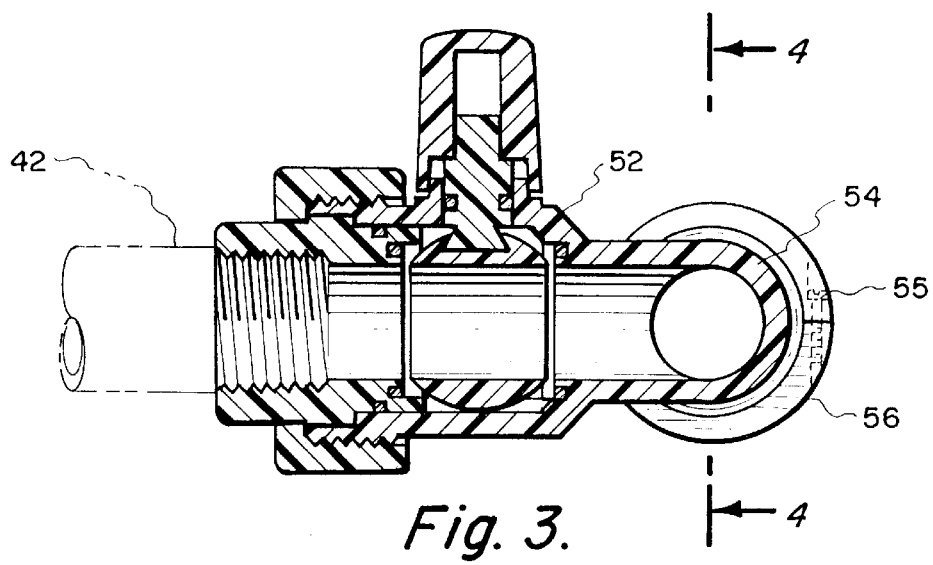
FIG. 3 is a sectional view, taken on the broken line 3—3 of FIG. 2.

The manifold means 40 is adapted for receiving water from a source such as shown by a phantom pipe 42, FIGS. 2 and 3. Source pipe 42 can enter the box 22 through the standard opening 15, for example, or through any other suitable opening (such as another one (not shown) that could be provided in the side wall 24 or the end wall 29. The manifold means 40 is also configured, fabricated and assembled to transport water from such a source to various outlets, as described herein. Persons of ordinary skill in the art will understand that the various connections between the manifold components should be watertight, to prevent leakage of water from the apparatus 10.

The apparatus 10 also preferably includes valve means 50 assembled with the manifold means 40 for directing the flow of water therethrough. To reduce the space and materials required to accomplish certain manifolding, as well as to reduce the amount of time, effort and money required to assemble and maintain the apparatus, various manifold components are preferably integrally formed with each other. This can be accomplished by appropriate design of injection molding cavities or similar expedient. For example, the preferred valve means 50 includes an integrally-formed valve 52 and tee 54, affixed to the water source inlet 42.

As shown, the preferred embodiment of this main valve 52 is a ball valve, although, as with most of the components of the apparatus, persons of ordinary skill will understand that a wide variety of other suitable components may be effectively utilized without departing from the scope of the invention. With respect to this main valve 52, for example, any suitable valve may be utilized, such as a gate valve (not shown), valves having straight handles instead of the central knob shown in the drawings, etc. The preferred main valve 52 serves as a manually-operable main shut-off for use in assembly, testing, installation, maintenance and/or replacement of the apparatus or components thereof. Closing the main valve 52 shuts off the flow of water to the rest of the apparatus 10.

The tee 54 permits a compact arrangement of further manifolding to be assembled within the valve box 22, as described herein. By forming the valve 52 and tee 54 integrally (preferably in a single injection molding cavity, see FIGS. 3–5), the number of separate components is reduced, as is the time, space and expense required to assemble same. In addition, an area of potential leakage (the junction between a standard valve and tee) is eliminated.

The preferred tee 54 splits the water flow from the single inlet source 42 and directs a portion of it to each side of the valve box 22, where it can then be manipulated, distributed and controlled through other components of the apparatus 10. Although the tee 54 illustrates the water flow being divided into two portions in opposing directions (one going to each side of the valve box 22), persons of ordinary skill in the art will understand that other "flow-splitting" configurations and structures may be provided to accomplish, for example, dividing the flow into more than two portions, directing the divided flow in a variety of directions, not dividing the flow at this point in the manifold (not having any tee but instead directly attaching the water source to the remainder of the manifold), etc.

The aforementioned watertight connections between various components of the apparatus 10 may be accomplished in various ways, as will be readily appreciated by persons of ordinary skill in the art. As shown in FIGS. 1–4, for example, conventional O-rings and seals may be utilized, and the integral valve 52 and tee 54 may be operably connected to other downstream manifold components by clamps 56 or a similar expedient. As illustrated in FIGS. 1–3, clamps 56 may be retained in position (holding components of the manifold to each other) by any suitable means, including screws 55. One of the many alternative embodiments of clamp means useful in the invention is discussed below and illustrated in FIGS. 11–14, as a snap-on clamp means.

The preferred orientation and configuration of the tee 54 in the preferred embodiment also permits the valve 52 to be rotated (about a center line running through the center of both clamps 56) relative to the box 22 and the rest of the manifold, which can help in aligning and attaching the water source to the manifold.

Figure 4:
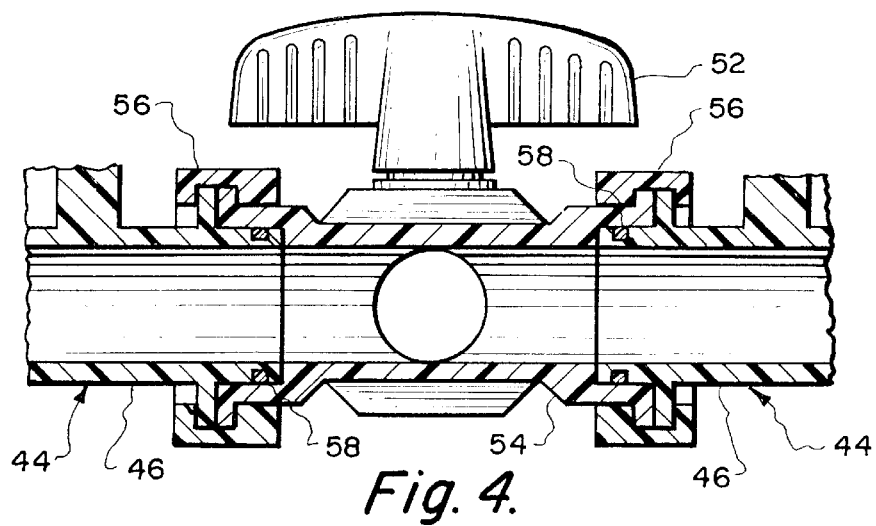
FIG. 4 is a sectional view, taken on the broken line 4—4 of FIG. 3.
Figure 5:
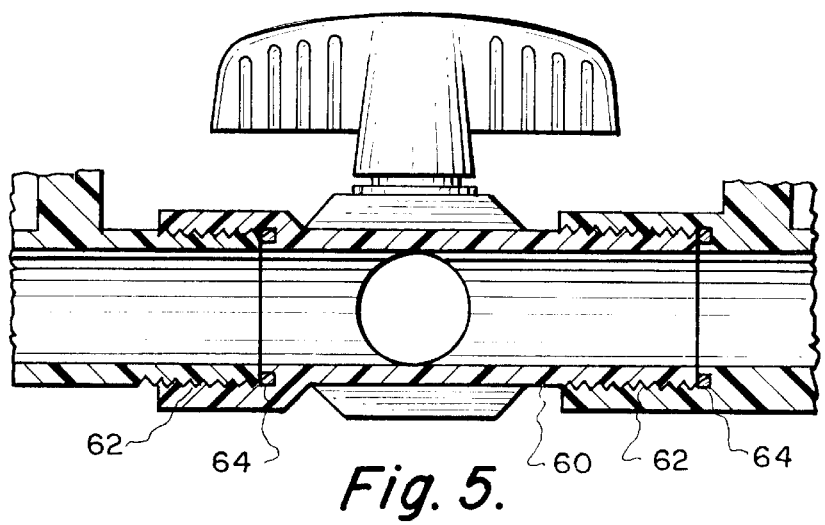
FIG. 5 is a similar to FIG. 4, but illustrates one of the many alternative means for connecting certain of the manifold components to each other.

An alternative embodiment illustrated in FIG. 5 illustrates the use of threaded connections 62 between such downstream components and a tee 60 (which tee is otherwise similar to tee 54 of FIG. 4). Although the various components are preferably detachably connected from each other (by clamps, threads or similar expedient) so as to permit ready replacement of components and customization of the apparatus to a particular site, aspects of the invention can be practiced with permanent affixation of the components to each other and to the valve box 22. Such permanent affixation can be accomplished, by way of examples, by gluing, heat welding, sonic welding, etc.

Persons of ordinary skill in the art will further understand that the integration of components of the apparatus can encompass a wide variety of combinations in addition and as alternatives to those illustrated herein. For example, the tee 54 might be integrally molded with the adjacent downstream components, in addition to or instead of being integrally molded with the ball valve 52.

Preferably, O-rings 63 or similar expedients at the outlet ports of the tee 54 accomplish the desired watertight seal at those locations. For embodiments similar to FIG. 5, washers or O-rings 64 may be readily utilized.

The preferred components of the apparatus 10 downstream of the tee 54 include additional portions of the manifold means. The preferred embodiment (as best illustrated in FIGS. 1, 2, 6 and 7) includes a plurality of outlet pipes 70 positioned through openings in the sidewalls 24 and 26. As indicated elsewhere herein, conventional valve boxes may be modified for use with the preferred embodiment of the invention by drilling or otherwise providing such holes or openings in the sidewalls.

Water may be directed through selected of the pipes 70 by use of additional valve means 50 such as one or more valve members 57. In the preferred embodiment, the valve members 57 are actuated by corresponding solenoid assemblies 58. The solenoid valve assemblies 57 and 58 are mounted adjacent the outlet pipes 70. As more thoroughly described below, control means 80 (including the solenoid actuator means 58, power lines 82, and a main terminal or junction box 84) permit the controlled, selective actuation of each valve member 57, thereby controlling the flow of water through the corresponding outlet pipe 70 and thence through the downstream irrigation system (shown in phantom as members 72, FIG. 1).

Those skilled in the art will understand that the downstream irrigation system 72 can be any of a wide variety of devices, including without limitation additional pipe to distribute water to drip or spray irrigation outlets remote from the valve box 22.

Preferably, the outlet pipes 70 are mounted and retained in the wall portions of the housing means 20, such as walls 24 and 26. This mounting and retention can be accomplished by any suitable means, including without limitation heat-staking, threaded retaining nuts (see FIGS. 19 and 20, for example, and related discussion herein), adhesive, or the like. As illustrated, the preferred embodiment utilizes spring clip members 74. Clip members 74 are preferably sized and configured to snap into grooves 76, FIGS. 6 and 7, on the outlet pipes 70 adjacent and abutting the sidewall 24 or 26, thereby preventing the further lateral movement of the outlet pipe with respect to the valve box 22. As discussed herein, the outlet pipes and the manifold member 44 with which they are preferably integrally formed are thereby operably mounted to the valve box, and the just-described affixation of more than one outlet means on a manifold member 44 also prevents rotational movement of the manifold member 44 with respect to the valve box 22.

The horseshoe or spring clip members 74 or their equivalents also help prevent moisture and dirt from entering the valve box 22 via the openings through which the outlet ports 70 protrude. The openings are preferably slightly larger than the outlet ports 70, to permit ease of assembly and alignment, and the horseshoe clips 74 help cover the gap between the opening and the port after assembly. Due to manufacturing, molding and assembly tolerances in the preferred embodiment, there may be some horizontal or lateral "play" in the assembly; in other words, the horseshoe clips 74 may not on their own hold the internal valve assembly against all shifting relative to the valve box 22. Among the alternatives to provide a more snug fit and reduce any such lateral shifting is to place one or more spacer members 75, FIG. 1 (such as rubber washers or gaskets or O-rings) between the clip members 74 and the sidewalls of the valve box 22.

Further detail on the clip members 74 and some of the many alternative embodiments thereto are illustrated in FIGS. 15–20. Persons of ordinary skill in the art will understand that retaining devices (such as illustrated in FIGS. 15–20) for assembling other components of the preferred embodiment of the invention are useful in other applications (not shown).

Figure 16:
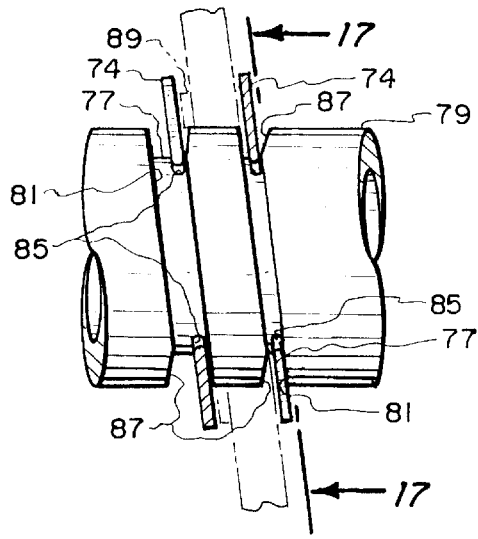
FIG. 16 is a partially sectional elevational view of an embodiment of two clip members assembled on an outlet.
Figure 17:
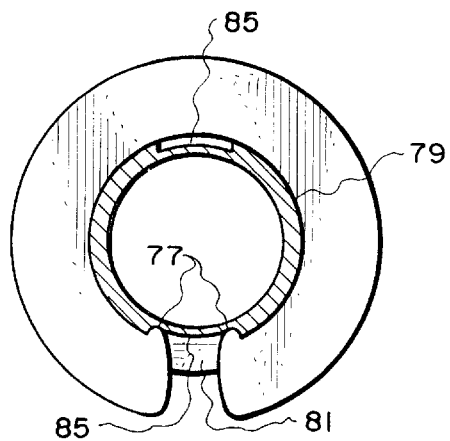
FIG. 17 is a sectional view taken on the broken line 17—17 of FIG. 16.

The preferred horseshoe clip 74 includes detents or protrusions 77 at each end thereof, projecting inwardly, FIGS. 15–18. The preferred outlet 79 (similar to outlets 70 in FIGS. 1 and 2) includes slots 81 to receive the clips 74. As best illustrated in FIG. 16, the slots 81 can be relatively wide (as on the left-hand slot 81) or preferably more closely matched to the thickness of the clip member 74 (as on the right-hand slot 81, FIG. 16). As will be understood by persons of ordinary skill in the art, the narrower version of the slot 81 permits any longitudinal forces between the sidewall (shown in phantom in FIG. 16) and the outlet 79 to be distributed across a larger contact area of the clip 74. As previously described, a spacer member such as a rubber washer 89 (shown in phantom in FIG. 16) may be used to tighten the longitudinal fit between the clips 74 and the sidewall (also shown in phantom in FIG. 16).

The preferred outlet 79 also preferably includes corresponding receiving portions or notches 85 for receiving the detents or protrusions 77. The cooperating detents 77 and receiving portions 85 help retain the clips 74 in the slots 81, among other things. In order to provide ready molding of the outlet portion 79, the slots 81 also preferably include flat or angled surfaces 87, to permit the injection mold to pull apart easily.

By providing a plurality of such notches 85 at various locations about the outlet 79, the detents 77 can be readily engaged from a variety of directions, providing flexibility to the assembly and improving the ease of assembly and subsequent maintenance or modification. Although two such notches are illustrated in each of the slots 81 in FIGS. 16 and 17, on opposite sides of each slot., persons of ordinary skill in the art will understand that a wide variety of corresponding notch and detent arrangements can be utilized, including without limitation four notches in each slot, having the detent on other parts of the clip member, and/or reversing the detent and "notch" portions so that detent structures on the outlet 79 engage "notches" on the clip members 74.

Figure 18:
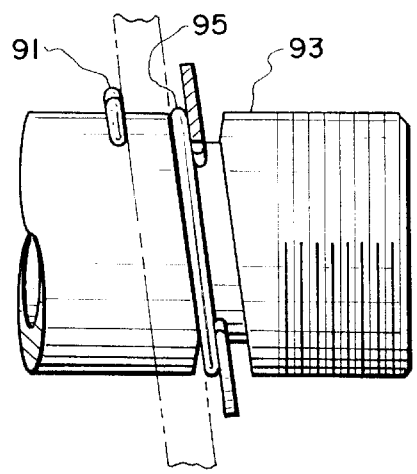
FIG. 18 illustrates one of the many alternative embodiments for retaining the outlets in operable assembly with the preferred valve box of the invention.

Some of the many alternative embodiments for retaining the outlets in operable assembly with the preferred valve box of the invention is illustrated in FIG. 18. On the left side of the phantom sidewall, a detent or rib 91 may be formed with or attached to the outlet 93. The detent 91 abuts the sidewall, thereby eliminating the necessity of one clip. The right side of the phantom wall illustrates an arrangement similar in many ways to the left side of FIG. 16, but includes an O-rings 95 for tightening the assembly against longitudinal shifting.

Figure 19:
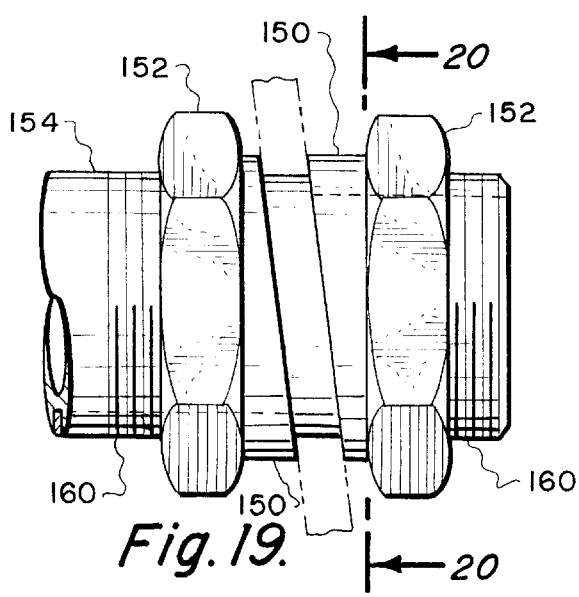
FIG. 19 illustrates another of the many alternative embodiments for retaining the outlets in operable assembly with the preferred valve box of the invention.
Figure 20:
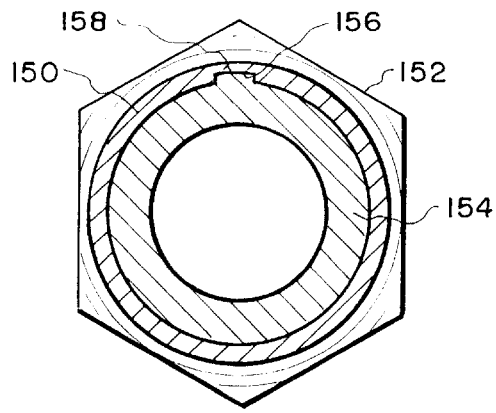
FIG. 20 is a sectional view taken on the broken line 20—20 of FIG. 19.

Another of the many alternative embodiments of attachment means for retaining the outlets in operable assembly with the preferred valve box of the invention includes a keyed washer 150 and threaded nut 152, FIGS. 19 and 20. Threading 160 is provided along the outside of the outlet 154 at locations which permit ready engagement and adjustment and tightening of the nuts 152.

The keying is desirable to ensure proper alignment of the washer 150 for applications in which the sidewalls of the valve box are not perpendicular to the centerline of the outlet 154. In the embodiment of FIGS. 19 and 20, the keying is shown as including a cooperating detent 156 and slot 158, although persons of ordinary skill in the art will understand that a wide variety of keying arrangements can be utilized.

In the embodiment of FIGS. 19 and 20, some arrangement must also be provided to permit assembly of the nut 152 inside the valve box. For example, the detents 158 must be deformable (to permit the internal nut to pass over the detents), the internal nut 152 must also be keyed and the threading 160 not be present at the longitudinal position of the keying, or the internal nut must be assemblable onto the outlet 154 from the inside of the valve box.

Persons of ordinary skill in the art will understand that a wide variety of combinations of the structures and methods described herein (such as various combinations of the structures in FIGS. 15–20, for example) can be used effectively in various embodiments of the invention.

As indicated above, the preferred manifold means 40 also includes one or more integrally-formed manifold members 44. As illustrated herein, there are two such members 44, each having a single inlet port 46 and a plurality of outlet ports 70. Although the drawings illustrate an embodiment having one inlet port 46 and three linearly-aligned outlet ports 70, those skilled in the art will understand that a wide variety of configurations can be usefully employed within the teachings of the invention, including more or fewer outlets or inlets, non-linear alignments thereof, etc. As indicated above, the preferred outlet ports 70 are adapted (by mating threads or other suitable means) for connection with distribution lines 72 for downstream distribution of the water.

The preferred manifold members 44 also include integrally-formed attachment sections 48 near each outlet port 70. These attachment sections are configured to selectively receive either a plug member 49 (FIGS. 2 and 7) to prevent flow through the port, or to receive one of the aforementioned solenoid valve assemblies 57 and 58. As noted above, the manifold of the invention can consist of, and/or include, such integrally formed or interconnected valves or valve bases, as shown in the drawings.

In the preferred embodiment, interchangeable screws 59 or similar expedients attach either the plug members 49 or the valve members 57. The precise selection of either a plug or a solenoid valve for any particular attachment section 48 will depend on a number of factors, including whether any flow is desired from the corresponding outlet port 70. Once the decision has been made, the selected plug or valve can be attached to the attachment section 48 by directly screwing the plug or valve to the attachment means 48 (as illustrated with the plug 49 in FIG. 2).

In one of the many alternative ways of attaching the valve to the attachment means 48 (as illustrated with the five valve members 57 in FIG. 2), the valve is provided with supplemental openings 61 sufficiently large to allow the heads of the screws 59 to pass therethrough. The plug 49 is illustrated without such supplemental openings, although persons of ordinary skill in the art will understand that such supplemental openings 61 could be provided and used on said plug 49 in a manner similar to that described herein for valve members 57. As illustrated, assembly of the plug 49 on attachment means 48 would require removal of the screws 59, positioning of the plug 49 on the attachment means 48, and insertion of the screws 59.

For use with the supplemental openings 61, the screws 59 are preferably assembled in the attachment means 48 prior to attachment of the plug or valve, but are sufficiently loosened to permit the openings 61 in the plug or valve to be placed over the screws 59. Subsequently, the plug or valve is rotated so that the opening 61 rotates laterally from under the screw heads, and the screws are then tightened to hold the plug or valve in place. This alternative permits even easier replacement and customization of the manifold means. Among other things, it permits end users to more readily remove the solenoids from the assembly and store them inside for the winter (thereby potentially extending the life of the solenoids).

Those of ordinary skill in the art will understand that the invention provides a tremendous amount of flexibility in assembling an irrigation system. For example, during fabrication and initial assembly, a standard arrangement of valves and plugs can be assembled on the manifold members 44, or custom arrangements can be readily assembled. Among other flexibility provided by the invention, additional substitute plugs and valves can be affordably inventoried and/or purchased and installed by the end user (the aforementioned screws 59 and openings 61, along with the ready electrical connections discussed elsewhere herein make it easy to change the plugs and valves).

The manifold means 40 further preferably includes additional attachment means 90 such as a threaded outlet or similar expedient for selectively attaching either cap means 92 (for terminating the manifold means) or attaching further manifold components (not shown). In the preferred embodiment, the additional attachment means 90 are located at both ends of the manifold member 44, and are integrally molded therewith. Water-tight caps 92 or similar expedient can be readily utilized to terminate the manifold at that location.

As indicated elsewhere herein, at least two of the various manifold fittings 48 are preferably integrally molded with each other, and the ball valve 54 and tee 52 combination are likewise formed with each other. Persons of ordinary skill in the art will further understand that different and/or additional combinations of components may be integrally formed, and provide similar benefits of compactness, modularity, and ease of manufacture and assembly, all without departing from the teachings of the invention. Among other things, these combined components eliminate the need for fittings that would otherwise be necessary to join the components (such as the valve 54 and the tee 52).

As indicated above, the preferred embodiment also includes control means 80. As illustrated, the control means 80 preferably includes the solenoid actuator means 58, power lines 82 to distribute power to the solenoid actuator means 58, and a main terminal or junction box 84 affixed to the valve box 22. Preferably, a main power and control cable 86 connects the junction box 84 to a remote power supply (not shown) and control unit (not shown). The main power and control cable can be affixed to the apparatus as part of the fabrication process (prior to shipment to an installation site), or may be attached at the installation site. As illustrated in FIG. 2, the cable 86 passes through the standard valve box opening 15 and then runs up the inside of box end 28 to connect to the junction box 84. Other embodiments (not shown) would include, without limitation, passing the cable 86 through another opening in the side of the valve box 22, and mounting a battery-powered controller in or on the housing means 20 (the latter alternative would eliminate and/or reduce the need for an external power source).

In a typical installation of the apparatus for irrigation of a lawn, a plurality of apparatuses 10 may be buried at various locations, with each having a main power and control cable 86 running to a central control unit, mounted on a wall (such as a homeowner's garage wall). The operation of the irrigation system can thereby be controlled from that central control unit.

As also indicated above, the control means 80 permits the controlled, selective actuation of each valve member 57, thereby controlling the flow of water through the corresponding outlet pipe 70 and thence through the downstream irrigation system (shown in phantom as members 72, FIG. 1). To facilitate ready manufacture, installation, testing, use and servicing of the control means 80, the housing means 20 includes retaining means 100 for retaining the power lines in a desired position relative to the housing means 20. The retaining means can be provided in any suitable form, including heatstaking clips to the inside of the housing means 20, gluing or otherwise adhering the wire harnesses 82 to the walls of the valve box 22, and/or integrally forming suitable structures (such as channels, clips, etc.) into the valve box 22.

As illustrated in FIGS. 1, 2, 8, and 9, the retaining means 100 includes heatstaking or otherwise affixing to the inside of the walls 24 and 26 water-tight connector assemblies 102. Preferably, these water tight connector assemblies 102 such as the male and female connectors 104 and 106 are positioned adjacent each of outlets 70 and the attachment sections 48, so that solenoid valve assemblies 57 and 58 may be readily connected to (and disconnected from) the electrical power and the control unit of the irrigation system. This arrangement permits ready connection and disconnection (for replacement or plugging purposes) of solenoids from the assembly 10, while protecting the electrical connections from undesirable moisture and/or dirt and consequent risk of shorting out.

By such a preferred arrangement, a solenoid valve may be installed and/or replaced in the apparatus with a minimal effort. As indicated above, the screws 59 are loosened, the old valve (if any) is rotated to align the holes 61 with the screws 59 and is then removed, a new valve is positioned over the screws and rotated and tightened into place, and the electrical connection is made to the adjacent connector 102.

The desired watertightness between the male and female connectors 104 and 106 may be provided, for example, by an O-rings 114 or similar expedient. Either of the male or female connectors 104 or 106 may be attached to the power lines 82 which run to the junction box 84, and may be glued, heatstaked or otherwise fastened to the valve box 22 by the retaining means 100. The drawings illustrate one of the many alternative methods of that retention, the use of heatstaked rivets 108 integrally formed as part of a retaining member 110. In the preferred embodiment, a channel 112 is placed over the power lines 82 and the female retaining connector 106, and the ends of rivets 108 placed through openings in the valve box 22, and those ends are then riveted to hold the assembly in place on the sidewall.

The other of the male or female connectors 104 or 106 is preferably attached to additional portions 83 of the power lines 82 which are connected to their respective solenoids 58 in a conventional manner, FIG. 2, or by some similar expedient. Persons of ordinary skill in the art will understand that, although the preferred complete wires 83 are only fully illustrated (showing the complete connection to the solenoid) on the upper right solenoid assembly in FIG. 2, the other solenoids are preferably operably connected in the same or a similar manner to their corresponding adjacent portions 83 of the power lines 82. The preferred solenoid assembly useful in the invention therefore includes the electrical wires 83 affixed from the solenoid itself to the male or female connectors 104 or 106 (shown in the drawings as affixed to male connector 104). This enables the aforementioned ready replacement and removal of solenoids from the assembly 10.

Among the alternative embodiments of the invention, the male or female connectors 104 or 106 can be flipped (the male connector 104 could be affixed to the wires 82 running from the junction box 84 to the retaining member 110, and the female connector 106 affixed to the wires 83 running to the solenoid 58).

In the event that the entire valve box 22 floods and there are "uncovered" female outlets 106, shorting can be prevented by covering those outlets 106 with plugs (not shown) or with a dielectric silicone gel, epoxy, some non-conducting, non-hardening gel or paste (not shown), or by some similar expedient.

Figure 10:
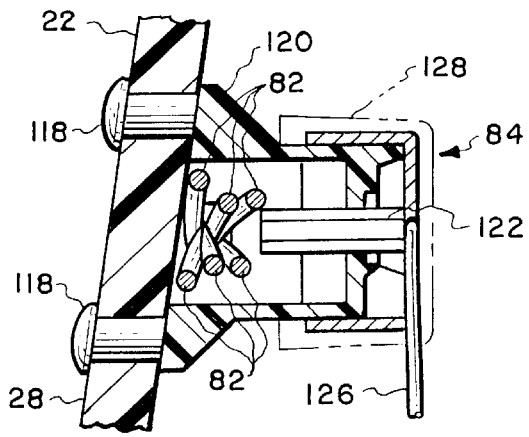
FIG. 10 is a sectional view taken on the broken line 10—10 of FIG. 2.
Figure 11:
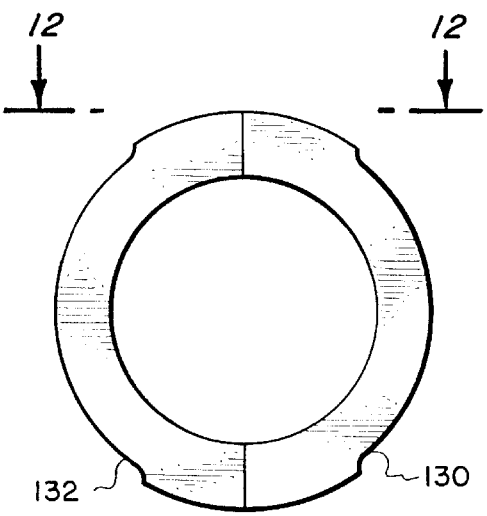
FIG. 11 is a side elevational view of a snap-on clamp member useful in connecting manifold components of the assembly.

The junction box 84 is preferably riveted or heatstaked or otherwise operably affixed to the valve box 22 as illustrated in FIG. 10 (using rivets 118 integral with housing 120, similar to rivets 108 integral with retaining member 110 ). The power lines 82 are preferably gathered inside the housing 120 (which is filled with non-conducting, non-hardening gel, to prevent shorting), and each line 82 is affixed in electric communication with the inside end of a corresponding terminal 122. The ground wires running from each female connector 106 are preferably affixed to a single ground terminal such as terminal 124.

Preferably after the assembly 10 is brought to the installation site, the input cable 86 (including its preferable plurality of wires 126 sufficient to carry signals to operate each of the solenoids 58 independently of the others) is positioned through the standard opening 15 and the wires 126 are connected to the exposed or outer end of terminals 122, by screws (not shown) or similar expedient. A cap member 128 (indicated in phantom, FIG. 10) may also be placed over the terminals after all wires 126 have been connected, to help prevent shorting. Cap member 128 is preferably also filled with non-conducting, non-hardening gel for that purpose. Persons of ordinary skill in the art will understand that the functions and assembly of the junction box 84 can be accomplished by a wide variety of equivalent structures and methods.

An alternative embodiment of the clamp means 56 is illustrated in FIGS. 11–14 as clamp portions 130 and 132. The portions 130 and 132 can be used to hold portions of the manifold means in operative assembly, such as in the position shown in FIG. 4.

Figure 12:
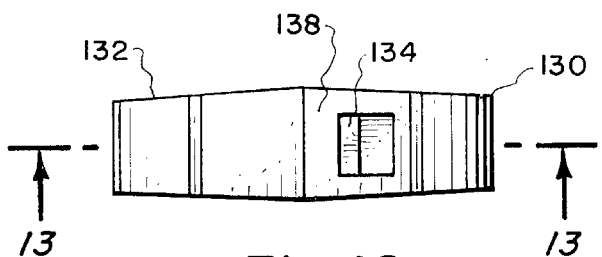
FIG. 12 is a top view taken on the broken line 12—12 of FIG. 11.
Figure 13:
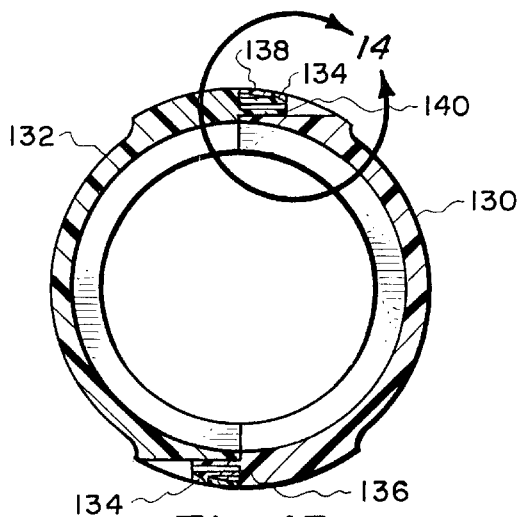
FIG. 13 is a sectional view taken on the broken line 13—13of FIG. 12.
Figure 14:
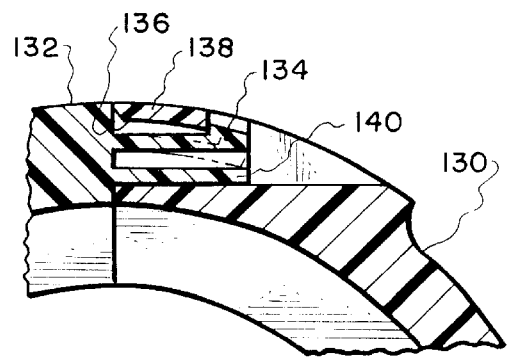
FIG. 14 is an enlarged view taken on the circular line 14—14 of FIG. 13.
Figure 15:
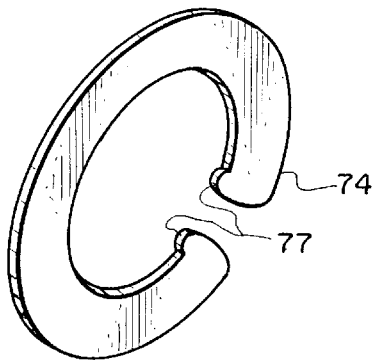
FIG. 15 is an isometric view of a preferred embodiment of a clip member for assembling other components of the preferred embodiment of the invention.

Although the clamp of FIGS. 11–14 is illustrated as comprising two interchangeable, identical halves, persons of ordinary skill in the art will understand that more than two portions could be utilized to provide the entire circular configuration of the clamp, and that the portions do not have to be interchangeable (although identity of parts reduces the costs of molding, costs of inventory, and makes assembly easier). As shown in FIGS. 12–14, each half 130 and 132 include male and female portions 134 and 136 which are designed and configured to snappingly interengage with the opposing male or female portion of the other half. Preferably, the male member 134 is fabricated with spring-like material memory so that, when inserted into the female portion 136, it deflects downwardly (as shown in phantom in FIG. 14) and then springs back upwardly into engagement with a corresponding detent 138 adjacent the female portion 136. A lower wall 140 preferably extends parallel to the male member 134, and helps hold the halves 130 and 132 in a desired alignment. The halves can be separated from each other (and the corresponding manifold components released from each other) by depressing the male member into the position shown in phantom in FIG. 14 and moving the halves away from each other. Preferably, the materials used to fabricate the male member 134 are sufficiently resilient to permit repeated assembly and disassembly of the clamp portions.

In one of the many alternative embodiments of the invention (not shown), two or more portions (such as halves 130 and 132 ) may be hinged to each other and one or more linkages between the portions fastened to each other by means of the above-described male and female snapping engagement means. Thus, the invention provides a substantially compact, pre-assembled apparatus for installation in an irrigation or sprinkler system. The invention also includes a related method for installing an automated sprinkler system. The preferred method includes: providing a pre-assembled valve box such as described herein, positioning the pre-assembled apparatus at a desired final location at an installation site; connecting a water source to the inlet; connecting other components to the outlets; and connecting an electric power source to the power lines.

This method and apparatus also provides an ability to test the manifold and the electric power and controls systems in the apparatus prior to installation. Such testing can conveniently occur on an assembly line or at a test-bench in a manufacturing facility, prior to even shipping the apparatus to a wholesaler, retailer, or consumer. By way of example, the system's water-tightness can be tested by attaching a water source to the inlet 42 and plugging the outlets 70 (with caps or similar expedients). Turning on the water supply will pressurize the manifold and reveal leakage problems. For electrical integrity, the main power supply line 86 can be affixed to the apparatus and the valves manipulated by an attached control means on the test bench.

In a typical home sprinkler system, the solenoids are turned off (no water flows) virtually 99% of the time. Commonly, each valve is opened 15 minutes every other day. Therefore it is important that the solenoids function properly in the off (or closed) position. As indicated above, the invention permits a manifold assembly, with all of the solenoids in place and hooked-up to electrical power, to be assembled and tested for water leakage prior to shipment to the installation site (this can be readily accomplished, for example, by attaching the assembly to a water source and static pressure testing the assembly). Previously, typical installation would involve placing the valve box into the ground, and assembling on-site all of the pipes, valves, solenoids, and fittings prior to placing them in the box in the ground. Any leakage that occurred in such prior art systems might only be detected (if at all) after the entire assembly was in the ground and hooked up to the main water supply. Prior art systems therefore require a much more cumbersome, awkward, and tiring repair protocol than required by the apparatus of the invention, which permits any leaks to be repaired on an assembly line or test bench, rather than in the ground.

In the preferred method and apparatus, each valve 57 and its corresponding power lines 82 are also labeled. This preferred corresponding indicia or labeling permits ready installation (of the power lines 82, solenoids valve assemblies 57 and 58, main power supply line 86, and/or other components), programming of the preferably remotely-located control unit, and repair and/or modification of the pre-assembled valve box apparatus.

The preferred embodiment of the invention thus reduces the number of separate components necessary to manifold an irrigation system, reduces the number of valve boxes required for a given irrigation system (by way of example and not by way of limitation, by readily permitting six or more valves in a standard 12"×12"×18" (width×depth×length) valve box, rather than the prior art 2–3 valves per box), improves the performance of the system by permitting better and easier initial quality control and reducing future maintenance, and improves the ease of installation and maintenance. It also provides a cleaner, tidier apparatus than was typically achievable with prior art systems, and is more economical to manufacture and assemble. For example, because fewer parts are required, fewer cycles are required for injection molding presses to fabricate the parts.

While the preferred embodiment and method of the invention has been described with some specificity, the description and drawings set forth herein are not intended to be delimiting, and persons of ordinary skill in the art will understand that various modifications may be made to the embodiments and methods discussed herein without departing from the scope of the invention, and all such changes and modifications are intended to be encompassed within the appended claims.

What is claimed is:

1. An irrigation apparatus for in-ground installation which comprises:
    a valve box; and
    a valve manifold disposed within said valve box having:
    a first set of at least two solenoid operated valves, each of said valves having a valve base, said at least two valves having a common integral valve base; and
    a single swivelable tee coupled to and feeding said valves, said tee having an inlet and at least one outlet coupled to said first set of valves, further including a second tee outlet and a second set of at least two solenoid operated valves coupled to said second tee outlet, said second set of valves disposed on an opposing side of said tee relative to said first set of valves and each having a valve base which is common and integral with the valve base of the other of said second set of valves.

2. The apparatus of claim 1 wherein the solenoids of each of said valves of said first and second sets of valves is disposed in a direction toward said tee.

3. The apparatus of claim 1 further including a shut off valve disposed in said tee for cutting off communication between said inlet and said first and second outlets.

4. The apparatus of claim 3 further including a shut off valve disposed in said tee.

5. The apparatus of claim 1 wherein said swivelable tee is swivelable about an arc of 360 degrees.

6. The apparatus of claim 2 wherein said swivelable tee is swivelable about an arc of 360 degrees.

7. The apparatus of claim 3 wherein said swivelable tee is swivelable about an arc of 360 degrees.

8. The apparatus of claim 4 wherein said swivelable tee is swivelable about an arc of 360 degrees.

9. The apparatus of claim 1 including a separate hermetically sealed electrical connection disposed within said housing and coupled to each of said solenoid valves.

10. The apparatus of claim 2 further including a separate hermetically sealed electrical connection disposed within said housing and coupled to each of said solenoid valves.

11. The apparatus of claim 8 further including a separate hermetically sealed electrical connection disposed within said housing and coupled to each of said solenoid valves.

12. The apparatus of claim 9 further including control means for controlling said valves disposed remote from said housing.

13. The apparatus of claim 10 further including control means for controlling said valves disposed remote from said housing.

14. The apparatus of claim 11 further including control means for controlling said valves disposed remote from said housing.

15. An irrigation apparatus for in-ground installation which comprises:
    a valve box; and
    a valve manifold disposed within said valve box having:
    a first set of at least two solenoid operated valves, each of said valves having a valve base, said at least two valves having a common integral valve base; and
    a single swivelable tee coupled to and feeding said valves, said tee having an inlet and at least one outlet coupled to said first set of valves,
    further including a shut off valve disposed in said tee for cutting off communication between said inlet and said at least one outlet, wherein said swivelable tee is swivelable about an arc of 360 degrees.

* * * * *